US008493598B2

(12) United States Patent
Gnanasambandam et al.

(10) Patent No.: US 8,493,598 B2
(45) Date of Patent: Jul. 23, 2013

(54) SYSTEM AND METHOD FOR AUTOMATED HANDLING OF DOCUMENT PROCESSING WORKLOAD

(75) Inventors: Shanmuganathan Gnanasambandam, Victor, NY (US); Naveen Sharma, Fairport, NY (US); Sriram Kailasam, Tamil Nadu (IN)

(73) Assignee: Xerox Corporation, Norwalk, CT (US)

( * ) Notice: Subject to any disclaimer, the term of this patent is extended or adjusted under 35 U.S.C. 154(b) by 534 days.

(21) Appl. No.: 12/876,623

(22) Filed: Sep. 7, 2010

(65) Prior Publication Data
US 2012/0057191 A1    Mar. 8, 2012

(51) Int. Cl.
*G06F 3/12* (2006.01)
*G06K 15/00* (2006.01)

(52) U.S. Cl.
USPC ....... 358/1.15; 358/1.13; 358/1.14; 358/1.16; 358/1.1

(58) Field of Classification Search
None
See application file for complete search history.

(56) References Cited

U.S. PATENT DOCUMENTS

| | | | | |
|---|---|---|---|---|
| 7,564,584 B2* | 7/2009 | Takahashi et al. | ............. | 358/2.1 |
| 7,567,360 B2* | 7/2009 | Takahashi et al. | ............ | 358/1.15 |
| 8,054,494 B2* | 11/2011 | Takahashi et al. | ............ | 358/1.15 |
| 2011/0211218 A1* | 9/2011 | Gilmore et al. | ............... | 358/1.15 |
| 2011/0216349 A1* | 9/2011 | McCorkindale et al. | ..... | 358/1.15 |
| 2013/0063774 A1* | 3/2013 | Nuggehalli et al. | ......... | 358/1.15 |

* cited by examiner

*Primary Examiner* — Satwant Singh
(74) *Attorney, Agent, or Firm* — Simpson & Simpson, PLLC

(57) ABSTRACT

A system for controlling flow of a plurality of raw print jobs from at least one user to at least one printer in a print-shop, the system including: a print job queue adapted to received the plurality of raw print jobs; a controller adapted to monitor the plurality of raw print jobs; an estimation module comprising at least one of an estimated execution time module and an estimated network overhead module, wherein the estimation module is adapted to estimate a time to process each of the plurality of raw print jobs and the estimated network overhead module is adapted to estimate a time to transmit each of the plurality of raw print jobs to an external cloud and receive each of the plurality of raw print jobs from the external cloud; a scheduler adapted to transmit each of the plurality of raw print jobs to the external cloud or the internal cloud based upon at least one of the time to process each of the plurality of raw print jobs and the time to transmit each of the plurality of raw print jobs to the external cloud and to receive each of the plurality of raw print jobs from the external cloud, wherein the external and internal clouds are each adapted to process the plurality of raw print jobs to a plurality of processed print jobs; and, a print ready queue adapted to receive the plurality of processed print jobs and to send the plurality of processed print jobs to a printer.

25 Claims, 14 Drawing Sheets

SYSTEM AND METHOD FOR AUTOMATED HANDLING OF DOCUMENT PROCESSING WORKLOAD

TECHNICAL FIELD

The presently disclosed embodiments are directed to providing a system and method for the automated handling of document processing workloads, and more particularly to providing a system and method of balancing internal and external clouds arranged to efficiently process documents throughout various loading demands.

BACKGROUND

Heavily clustering workstations and over-cautious provisioning, i.e., under provisioning, both have disadvantages in terms of power and cost, e.g., lost orders, maintenance, inability to handle peak load, etc. Moreover, known clustering based approaches do not solve idleness issues arising from seasonal demand due to inherent inelasticity of such approaches.

Print-shop workloads vary from a majority of other software-as-a-service workloads in that they are typically not communication intensive. However, the handling of print-shop workloads which are computation and/or data intensive exclusively on an external cloud results in the dominance of bandwidth problems. It should be appreciated that real workload inputs and outputs can be hundreds of megabytes (MB) or greater. Thus, the majority of print-shops cannot be helped by exclusively using an external cloud. Even if bandwidth capacity increases significantly, network speeds would remain orders of magnitude below processing speeds. In view of the foregoing, it has been found that a hybrid strategy such as the embodiments set forth herein is fairly effective.

Handling computational load spikes in a print-shop is a complicated problem. Under-provisioning often results in not being able to keep up with the production printer, e.g., Xerox's iGen Printer, in terms of jobs being print-ready. Some print-shops still have only a few digital front ends (DFEs), while others are more recently shifting towards clustering DFEs and other devices. With increases in computational complexity with regards to pre-press operations in a print-job, such as dimensional printing, image enhancement, advanced gamut mapping, etc., the computational infrastructure has heretofore lagged behind such increased needs. Over-provisioning is also not favored because it is a costly operation and computational resources are underutilized on average.

Although a hybrid system which utilizes both internal and external clouds may improve print-shop efficiency and throughput, currently there are no known techniques to recursively identify the index of the first job, from the head of the print queue or the last identified position, that would be automatically "bursted out" to the external cloud without the internal cloud having to wait on that job for any reason, while preserving processing order, e.g., chronological or customer/job arrival sequence, to the maximum extent.

SUMMARY

It has been found that performing load management in the following way greatly improves print-shop throughput and balancing during times of both high and low demand. Targeted jobs are pulled out from near the head of the print queue in a model-driven way, process the targeted jobs elsewhere at a lower overall cost, and reintroduce the targeted jobs back in the same place, i.e., order, without having any job, before or after the job being pulled out, wait extra, be re-sequenced or deteriorate throughput. The approach outlined herein is different from arbitrarily pulling jobs from the queue as arbitrarily pulling jobs will have the aforementioned drawbacks hindering batch job dispatches, such as pulling the first five jobs, first n jobs, etc., to a shop floor controller. In fact, the foregoing embodiments improve the average wait time at the print queue at a lower cost.

Broadly, the methods discussed infra provide a model-driven autonomic method that recursively identifies the index of the first job, from the head of the queue or from the previously identified position, that is to be bursted out to an external cloud without having the jobs in the internal cloud wait extra time on average, be re-sequenced or deteriorate throughput, while preserving processing order to the maximum extent. The present method and system applies generically to computing on a hybrid cloud with embodiments focusing on autonomically dividing workload amongst public and private clouds for bandwidth intensive print-shop processing. The present methods are self-tuning models that consider bandwidth and processing time for certain kinds of workloads. The usage of these models enables print-shops to reduce the randomness associated with processing on heterogeneous resources in an inter-cloud fashion and sporadic variations in internet bandwidth for extremely large file sizes that are atypical for the regular software-as-a-service (SAAS) workload model. Several strategies have been tested and found to be effective among which are benchmarking resources with known workload, time-of-day models for throttling the number of threads, etc. While the present methods are readily added as software features, they provide advantages, e.g., elasticity and portability, to small and large print-shops without the need to incorporate large rack systems, such as those provided by Hewlett Packard. Thus, the present methods can function with any cloud and scale as needed without onsite server racks. Furthermore, the present method includes several embodiments that leverage the above methods in print-shops to compensate for missing computing/bandwidth intensive features, to act as a provisioning/assessment aid and to provide the backend analytics to price and charge customers in new ways, e.g., bursting dependent charges. Experimentation shows that the present method algorithms produce significant computational speed-up in comparison to current known methods. Another advantage is that the present method algorithms opportunistically burst out making optimal use of print-shop resources that may have been purchased earlier.

The present methods propose a speed-up management algorithm that can autonomically adjust depending on the load at the DFE(s) or any clustered set-up, e.g., the internal cloud may or may not be clustered. As a result, there is never a need to overprovision and invest heavily upfront in computing resources. In fact, the present methods include a hybrid approach wherein provisions are made for less than average loading at the print-shop, i.e., referred to as internal cloud or IC, and opportunistically bursting out workload to an external cloud or EC. That is, present method incorporates novel estimation techniques that can select which jobs in a queue have to be burst out, if indeed workload has to be bursted out to the EC, for the benefit of speedup. This mitigates wasteful uploads or downloads which is the predominant problem with print jobs because of their large size. Tests of the present methods have been performed for samples of approximately 400 MB which increase to greater than 1 gigabyte (GB) upon print-shop operations such as RIP, Gamut Mapping and/or Image Enhancement. The present methods, through the use of cloud-bursting, make overheads unperceivable, i.e., if a job is externally processed and hence incurs some non-trivial overhead such as splitting the job, recombining the job, and to and fro transmission delays, then intelligently schedules such that the overhead is not perceived by the DFE or print-ready queue.

According to aspects illustrated herein, there is provided a method for controlling flow of a print job from a user to a printer in a print-shop, the method including: a) receiving a raw print job from a user in a print job store, wherein a memory unit comprises the print job store; b) performing in a first arithmetic logic unit at least one of: determining an estimated execution time for processing the raw print job; and, determining an estimated network overhead for transmitting the raw print job to an external cloud and receiving the raw print job from the external cloud; c) forwarding the raw print job to either an internal cloud or the external cloud based on the estimated execution time, the estimated network overhead or combinations thereof, wherein the step of forwarding is performed by a communication unit; d) processing the raw print job in the external cloud or the internal cloud based on the step of forwarding, wherein the processing of the raw print job results in a processed print job and at least one second arithmetic logic unit performs the step of processing of the raw print job in the external cloud and at least one third arithmetic logic unit performs the step of processing of the raw print job in the internal cloud; e) receiving the processed print job in a print-ready queue, wherein the memory unit comprises the print-ready queue; and, f) passing the processed print job from the print ready queue to the printer.

According to other aspects illustrated herein, there is provided a method for controlling flow of a plurality of raw print jobs from at least one user to at least one printer in a print-shop, the method including: a) receiving the plurality of raw print jobs from the at least one user in a print job store, wherein a memory unit comprises the print job store; b) arranging the plurality of raw print jobs in the print job store sequentially in a queue based on a time of receipt of each of the plurality of raw print jobs, wherein a top of the queue comprises raw print jobs from the plurality of raw print jobs received first in time and a bottom of the queue comprises raw print jobs from the plurality of raw print jobs received last in time, wherein the step of arranging is performed by a first arithmetic logic unit; c) forwarding the top of the queue to an internal cloud and forwarding the bottom of the queue to an external cloud, wherein the step of forwarding is performed by a communication unit; d) processing in at least one second arithmetic logic unit the top of the queue in the internal cloud and processing in at least one third arithmetic logic unit the bottom of the queue in the external cloud, wherein the processing of the raw print jobs in the top of the queue and the bottom of the queue results in processed print jobs in the top of the queue and the bottom of the queue, respectively; e) receiving the top of the queue and the bottom of the queue a print-ready queue, wherein said top and bottom queues are each respectively received by the print-ready queue immediately after the step of processing is complete, the print-ready queue comprises a plurality of processed print jobs and the memory unit comprises the print-ready queue; and, f) passing the plurality of processed print jobs from the print ready queue to the printer.

According to still other aspects illustrated herein, there is provided a method of identifying a first print job in a print queue selected from a plurality of print jobs in the print queue which may be bursted to an external cloud for processing of the first print job while substantially preserving a processing order of the plurality of print jobs, wherein the processing order comprises a sequential ordering of the plurality of print jobs based on an order in which each of the plurality of print jobs is received from a user in the print queue and a position of the first print job is initially second from a top position in the print queue, the method including: a) calculating in an arithmetic logic unit a first estimated time for completion of processing the first print job, wherein the first estimated time for completion comprises an execution time and a network overhead time; b) calculating in the arithmetic logic unit a second estimated time for completion of processing print jobs that arrived in the print queue prior to the first print job; and, c) comparing with the arithmetic logic unit the first estimated time for completion and the second estimated time for completion, wherein when the first estimated time for completion is less than the second estimated time for completion the first print job is identified as burstable, and when the first estimated time for completion is greater than the second estimated time for completion the position of the first print job is increased by one from the top position in the print queue and steps a) through c) are repeated.

According to still yet other aspects illustrated herein, there is provided a system for controlling flow of a plurality of raw print jobs from at least one user to at least one printer in a print-shop, the system including: a memory unit comprising a print job queue adapted to received the plurality of raw print jobs; an arithmetic logic unit comprising a controller adapted to monitor the plurality of raw print jobs; an estimation module comprising at least one of an estimated execution time module and an estimated network overhead module, wherein the estimation module is executed in the arithmetic logic unit and is adapted to estimate a time to process each of the plurality of raw print jobs and the estimated network overhead module is adapted to estimate a time to transmit each of the plurality of raw print jobs to an external cloud and receive each of the plurality of raw print jobs from the external cloud; the arithmetic logic unit further comprising a scheduler adapted to transmit each of the plurality of raw print jobs to the external cloud or the internal cloud based upon at least one of the time to process each of the plurality of raw print jobs and the time to transmit each of the plurality of raw print jobs to the external cloud and to receive each of the plurality of raw print jobs from the external cloud, wherein the external and internal clouds are each adapted to process the plurality of raw print jobs to a plurality of processed print jobs and the external and internal clouds each comprise at least one arithmetic logic unit adapted to process the plurality of raw print jobs; and, the memory unit further comprises a print ready queue adapted to receive the plurality of processed print jobs and to send the plurality of processed print jobs to a printer.

According to yet other aspects illustrated herein, there is provided a method for controlling flow of a plurality of documents in a data center, the method including: a) receiving the plurality of documents in a first processing queue, wherein a memory unit includes the pre-processing queue; b) performing in a first arithmetic logic unit at least one of: determining an estimated execution time for processing a first document of the plurality of documents; and, determining an estimated network overhead for transmitting the first document to an external cloud and receiving the first document from the external cloud; c) forwarding the first document to either an internal cloud or the external cloud based on the estimated execution time, the estimated network overhead or combinations thereof, wherein the step of forwarding is performed by a communication unit; d) processing the first document in the external cloud or the internal cloud based on the step of forwarding, wherein the processing of the first document results in a first processed document and at least one second arithmetic logic unit performs the step of processing of the first document in the external cloud and at least one third arithmetic logic unit performs the step of processing of the first document in the internal cloud; e) receiving the first processed document in a post-processing queue, wherein the memory unit includes the post-processing queue; and, f) passing the first processed document from the post-processing queue to a subsequent stage.

According to still yet other aspects illustrated herein, there is provided a method of identifying a first document in a pre-processing queue selected from a plurality of documents in the pre-processing queue which may be bursted to an external cloud for processing of the first document while substantially preserving a processing order of the plurality of documents, wherein the processing order includes a sequential ordering of the plurality of documents based on an order in which each of the plurality of documents is received from a user in the pre-processing queue and a position of the first document is initially second from a top position in the pre-processing queue, the method including: a) calculating in an arithmetic logic unit a first estimated time for completion of processing the first document, wherein the first estimated time for completion includes an execution time and a network overhead time; b) calculating in the arithmetic logic unit a second estimated time for completion of processing documents that arrived in the pre-processing queue prior to the first document; and, c) comparing with the arithmetic logic unit the first estimated time for completion and the second estimated time for completion, wherein when the first estimated time for completion is less than the second estimated time for completion the first document is identified as burstable, and when the first estimated time for completion is greater than the second estimated time for completion the position of the first document is increased by one from the top position in the pre-processing queue and steps a) through c) are repeated.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Figure 1A:
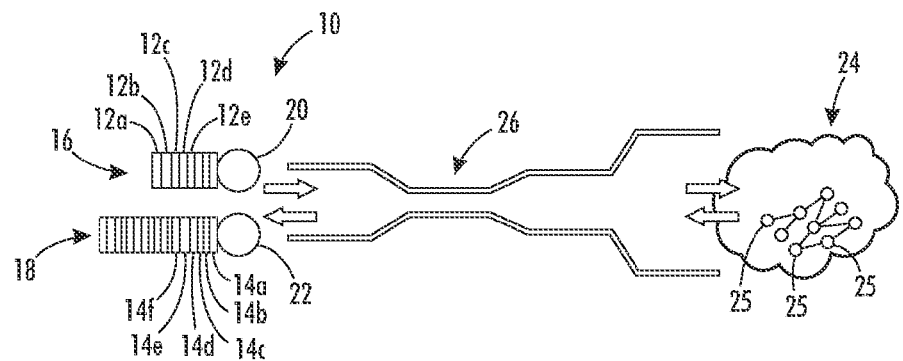
FIG. 1a is a diagrammatic representation of a print shop connected to an external cloud via the internet.

Unless defined otherwise, all technical and scientific terms used herein have the same meaning as commonly understood to one of ordinary skill in the art to which these embodiments belong. As used herein, "cloud bursting" is intended to mean computing in parallel on a hybrid cloud, i.e., a combination of internal and external clouds, while ensuring that the probability that any job in the internal cloud waits for a bursted out job is small on average. Waiting is common when the first n jobs have to be released to the shop floor controller and one or more of them have not finished processing thereby causing the printer(s) to be idle. This definition of cloud bursting has an embedded notion of being opportunistic as explained above. However, this is difficult given it must be known how long a job will take. In a non-homogenous inter-cloud infrastructure, not all computing resources are the same and the effective bandwidth varies sporadically, i.e., the internet is a series of connected "pipes" which expand and contract frequently, especially important to a model for print-shop workload where hundreds of megabytes are transmitted. It should be appreciated that although the internet is not made up of pipes, the analogy is helpful in understanding the present methods. This is diagrammatically represented in FIG. 1, wherein print-shop 10 includes print jobs 12a through 12e and print jobs 14a through 14f arranged in print queues 16 and 18, respectively. Depending on the capacities of printers 20 and 22, i.e., can printers 20 and 22 keep up with the demands of print queues 16 and 18, respectively, it may be necessary to pass print jobs to external cloud 24 comprising computers 25 via pipe 26 for pre-printing processing. As the bandwidth, i.e., throughput, of pipe 26 varies due to internet resource demands, the time it takes for documents to pass between print-shop 10 and external cloud 24 varies. As described in greater detail infra, the present methods accommodate this bandwidth variability while minimizing the likelihood of print jobs waiting in a queue or being printed out of sequence.

As used herein, an "external cloud" is intended to mean at least one computer arranged in a different location than the print-shop, including a plurality of computers interconnected to each other and the print-shop. As used herein, an "internal cloud" is intended to mean at least one computer arranged in the same location as the print-shop, including a plurality of computers interconnected to each other and the print-shop. As used herein, "over provisioning" is intended to mean having a single computer or group of computers which provide greater computing resources than require by the print-shop. As used herein, "under provisioning" is intended to mean having a single computer or group of computers which provide less computing resources than require by the print-shop.

As used herein, "inter-cloud application" is intended to be different from a hosted application in that an inter-cloud application involves jobs being opportunistically dispatched to the correct location. According to the present methods, print jobs can not merely be assigned to the first free resource. Embodiments of the present method include estimating when they will complete and when they do, and thus whether there will be enough slack time to make the round-trip. In view of the foregoing, an inter-cloud application is a cloud-burst engine that controls the location and slack with regards to its parallel execution. Slack is defined below with Equation (1):

$$\text{Slack for } J_i = \text{slack}_i = \max(h_i, c_i^{IC}) \quad (1)$$

wherein: $J_i$ is $i^{th}$ job that has arrived for processing in the print-shop;
$c_i$ is the estimated time at which $J_i$ will complete;
$T_i$ is $\{x | x=c_{i'} \text{ and } i'<i\}$—completion times of jobs that have arrived before the $i^{th}$ job;
$h_i$ is the $\max(T_i)$; and,
$c_i^{IC}$ is the estimated time at which $J_i$ will complete if executed on IC.

Furthermore, the words "printer," "printer system", "printing system", "printer device" and "printing device" as used herein encompasses any apparatus, such as a digital copier, bookmaking machine, facsimile machine, multi-function machine, etc. which performs a print outputting function for any purpose, while "multi-function device" and "MFD" as used herein is intended to mean a device which includes a plurality of different imaging devices, including but not limited to, a printer, a copier, a fax machine and/or a scanner, and may further provide a connection to a local area network, a wide area network, an Ethernet based network or the internet, either via a wired connection or a wireless connection. An MFD can further refer to any hardware that combines several functions in one unit. For example, MFDs may include but are not limited to a standalone printer, one or more personal computers, a standalone scanner, a mobile phone, an MP3 player, audio electronics, video electronics, GPS systems, televisions, recording and/or reproducing media or any other type of consumer or non-consumer analog and/or digital electronics. Additionally, as used herein, "sheet," "sheet of paper" and "paper" refer to, for example, paper, transparencies, parchment, film, fabric, plastic, photo-finishing papers or other coated or non-coated substrate media in the form of a web upon which information or markings can be visualized and/or reproduced. As used herein, a "raw print job" is intended to mean a print job prior to any processing, e.g., raster image processing (RIP), while "processed print job" is intended to means a print job post-processing, i.e., a print-ready file.

Moreover, although any methods, devices or materials similar or equivalent to those described herein can be used in the practice or testing of these embodiments, some embodiments of methods, devices, and materials are now described.

Figure 1B:
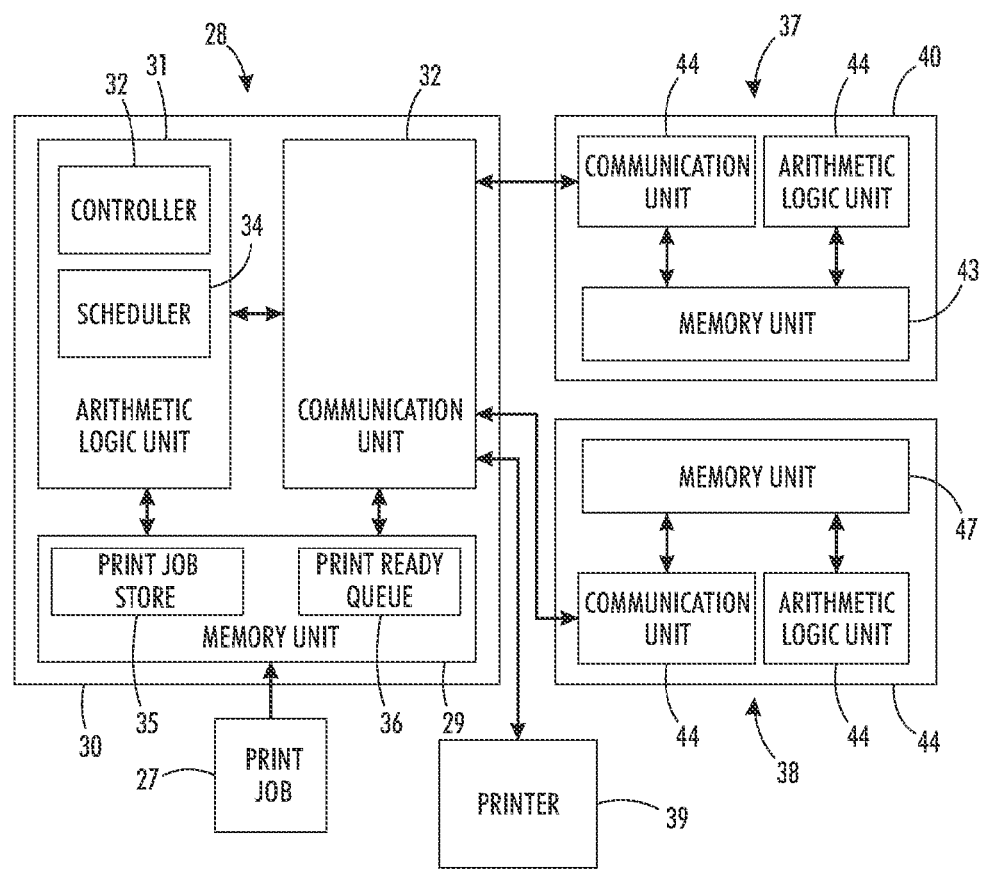
FIG. 1b is a schematic showing a digital front end of a print shop connected to internal and external clouds.

The present methods and system described infra utilize a variety of configurations of computers and processing devices. FIG. 1b shows an example of a system which includes a digital front end, an internal cloud, an external cloud and a printer. In this example, print job 27 is received by digital front end 28 in memory unit 29 arranged in computer 30. Computer 30 further includes arithmetic logic unit 31 and communication unit 32. Arithmetic logic unit 31 includes controller 33 and scheduler 34 and is arranged to interface with both memory unit 29 and communication unit 32, as is well known in the art. Memory unit 29 further includes print job queue 35 and print-ready queue 36. Communication unit 32 is arranged to interface with internal cloud 37, external cloud 38 and printer 39. Internal cloud 37 comprises computer 40, and computer 40 in turn comprises arithmetic logic unit 41, communication unit 42 and memory unit 43. Similarly, external cloud 38 comprises computer 44, and computer 44 in turn comprises arithmetic logic unit 45, communication unit 46 and memory unit 47. It should be appreciated that the foregoing arrangements of computers 30, 40 and 44 are merely examples, and the structures of computers 30, 40 and 44 may take other forms known in the art. Moreover, although digital front end 28, internal cloud 37 and external cloud 38 are depicted as each comprising a single computer, it should be appreciated that digital front end 28, internal cloud 37 and/or external cloud 38 may comprise more than one computer interconnected with the other computers of that particular cloud. Additionally, digital front end 28, internal cloud 37 and/or external cloud 38 may comprise a plurality of computers which are accessible based upon the processing requirement for the digital front end or the respective cloud.

The present methods include recursively identifying the index of the first job, from the head of the queue or previously identified position, that would be bursted out to an external cloud without the internal cloud having to wait on that job for any reason while preserving processing order to the maximum extent. In one embodiment, given a print batch size of n jobs, the present method includes cloud bursting from the top and end of the queue to the internal and external clouds, respectively, and replicating dispatches to either cloud therein to maximize throughput. This provides the advantage of lesser estimation requirements, i.e., less computational time spent on predicting work flow; however, this may result in jobs frequently being available out of order. In other embodiments, the present method may include various algorithms, alone or in combination, wherein DFE load management is performed and overall wait-time optimization is carried out for a suite of jobs for the print-ready queue. Such algorithms can include but are not limited to print-shop feature management, i.e., if a certain compute-intensive feature is absent in the print-shop, can this feature be effectively cloud-bursted by leveraging the standard cloud bursting architecture, and provisioning aid/analytics, i.e., profiling based on cloud bursting to be used to decide on the level of speed-up required to provision for print-shops. In other words, provisioning aid/analytics includes deciding what levels of speed-up are required for print-shops at different times, computing experimentally through the engine provided if on average such speed-up can be provided through the external and/or internal clouds, providing those resources on-demand and charging appropriately, e.g., speedup dependent charging for seasonal demand. The foregoing embodiments can be easily detected through features that are specified in typical print-shop environments. Thus, these features provide advantages even to shops that use cloud-computing to a certain degree, can be sold separately and can work with a variety of job types. It has been found that a variety of strategies can be utilized in the cloud-bursting architecture, which strategies are described infra.

An embodiment of a strategy that may be utilized with the present methods is referred to as processing time estimates. Processing time estimates resulted from use of a response surface model. The surface model was used and subsequently tuned by observing data from the actual system. In other words, this strategy starts with an initial best estimate model based on a standard set of print-shop data observed across a variety of print-shop jobs and subsequently learns and tunes the model depending on the specific conditions and resources available. A quadratic response surface model (QRSM) assumes that a quadradic polynomial f would relate y to the N independent variables considered, as set forth in Equation (2):

$$y = f(x_1, x_2 \ldots, x_N) \quad (2)$$

More specifically, as set forth in Equation (3):

$$y = a + \sum_{i=1}^{N} b_i x_i + \sum_{i,j=1; i \neq j}^{N} c_{ij} x_i x_j + \sum_{i=1}^{N} d_i x_i^2 \quad (3)$$

The coefficients ($a, b_i, c_{ij}, d_i$) for i, j=1 to N and i≠j are learned as the solution to a linear programming model. The dimensions $x_i$ are important features obtained from the input documents, e.g., pdf documents. The features include but are not limited to: document size; number of images; size of the images; number of images per page; resolution; color and monochrome elements; image features; number of pages; ratio of text to pages; coverage; and, specific job type. From the foregoing, a relevant set of features are extracted and utilized for every job type.

Figure 2A:
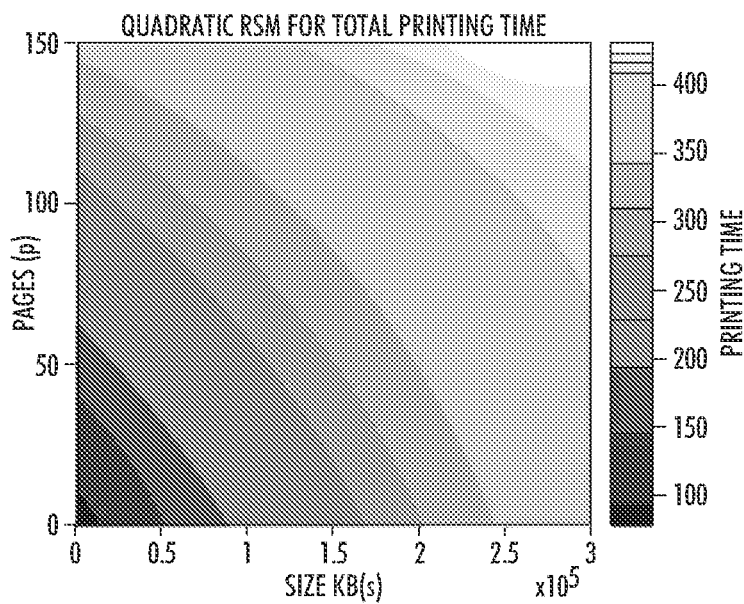
FIG. 2a is a first quadratic response surface model showing total estimated printing time based on print job file size and number of pages.
Figure 2B:
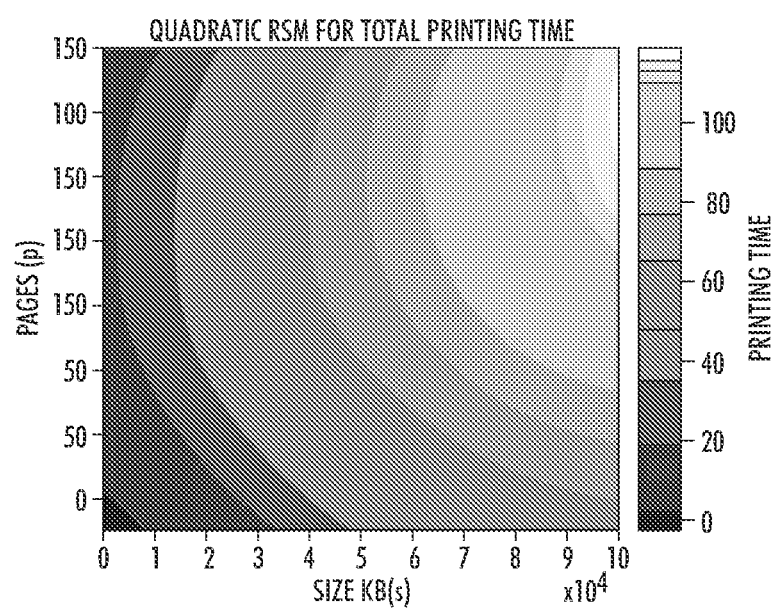
FIG. 2b is a second quadratic response surface model showing total estimated printing time based on print job file size and number of pages.

Examples of the surface models depicting processing time are shown in FIGS. 2a and 2b. Without loss of generality, dimensions can be added or deleted to the model as required by a specific job type. In these examples, the size of the print job file is shown on the x-axis, while the number of pages is shown on the y-axis. While, some non-convexity was observed and duly noted (See FIG. 2b), in some cases it is an artifact of a lesser number of dimensions being accounted for. It is believed that extracting more features from the input document, e.g., pdf document, will improve the performance of the present methods and system. In other cases, it is believed that the non-convexity is because there are residual limits after which the dimensions are able to show a pronounced impact in the response variable, such as, the document has to be of a certain size after which pages have an effect on RIP time.

Another embodiment of a strategy that may be utilized with the present methods is referred to as transit time estimates. The autonomic system is adapted to capture network conditions, and in turn calibrate its settings and modulate the cloud-burst engine's network activities. The upload and download bandwidth from an arbitrary print shop to an external cloud vary sporadically because of factors such as last-hop latency, time-of-day variations, bandwidth throttling, unavailability of higher capacity/bandwidth lines, etc. Since the present methods are extremely data intensive, adaptation to internet conditions by estimating the effective bandwidth improves system performance. Such adaptation is accomplished using a combination of techniques and novel calibration strategies to increase the throughput.

Figure 3A:
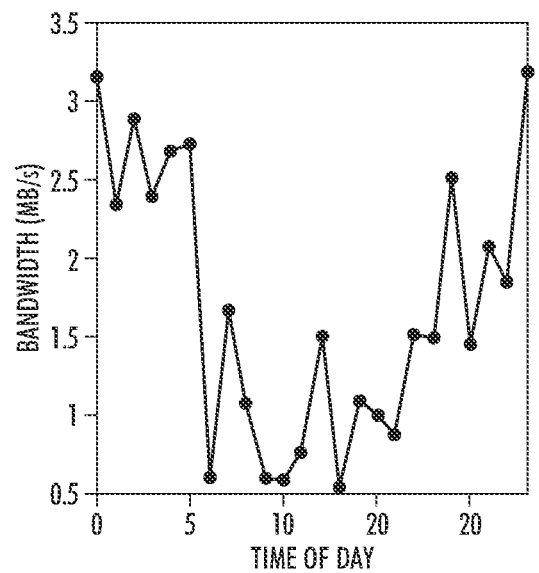
FIG. 3a is a graph showing available bandwidth based on the time of the day.
Figure 3B:
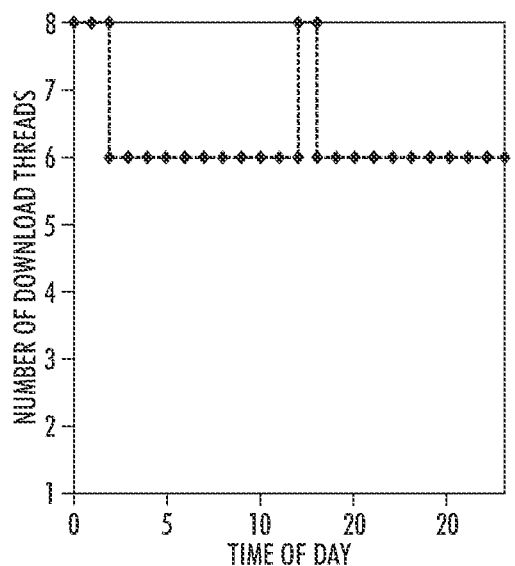
FIG. 3b is a graph showing the number of download threads based on the time of the day.

For example, a time-of-day (or seasonality) adaptive bandwidth model made be used. It is known that increasing the number of threads can provide more bandwidth; however, given a geographic location and time, the number of threads above a particular limit may be worthless. It was observed experimentally that using a certain number of threads for downloading/uploading a file in parallel can maximize the bandwidth utilization. FIG. 3a shows the variation of bandwidth across different times of a day. According to the present methods, this information is calibrated automatically and learned for every print-shop and the times of day they operate. This can further depend on the seasonality of the particular print-shop's demand. FIG. 3b shows the number of threads that were used to maximize the bandwidth utilization. In accordance with the present methods, every print shop can self-calibrate to network conditions using this way.

Another example includes preferential routing over dynamic edge locations. In short, this technique creates diversity in the routes that a print-shop utilizes. Xerox or another provider such as Amazon, Cloudfront or Akamai can provide edge locations throughout the nation or geographic region of interest. This provides for alternate routes in the event of congestion along regular routes. Since, this is equivalent to increasing bandwidth, additional revenue can be received for making this technique available on demand to print-shops. It is relatively easy for such service providers to accommodate, i.e., provide and revoke access along various routes, various print-shops on edge locations as transitory or hop points facilitating secure streams that the print-shops transmit. The time-of-day models and bandwidth estimator can be run periodically to benchmark and fine-tune network overhead estimates. The benchmarks can further be utilized for provisioning the print-shop, i.e., the service provider can make recommendations on optimizing print-shop parameters on the basis of the benchmarking results that are periodically submitted.

Figure 4:
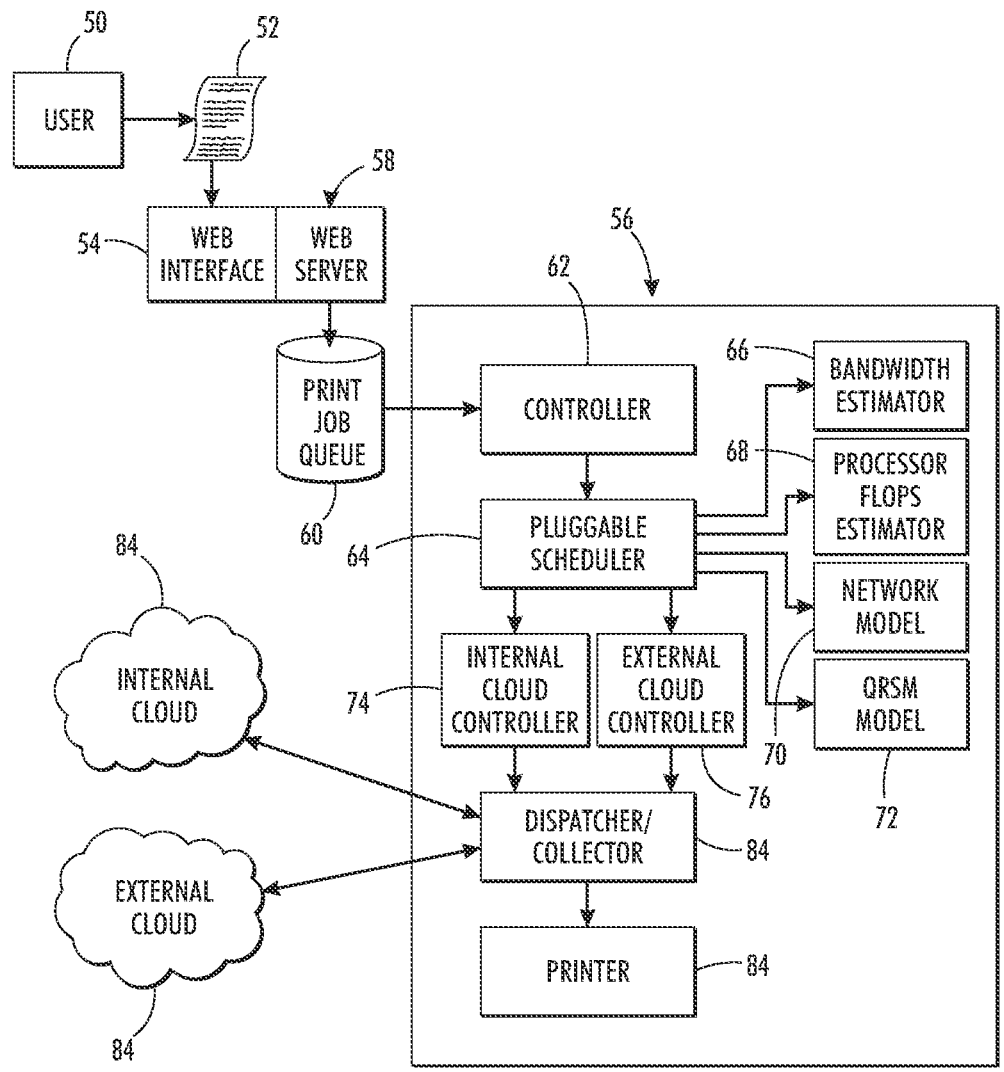
FIG. 4 is a schematic of an embodiment of the present system used to control printing of print job in a print-shop.

Yet another embodiment of a strategy that may be utilized with the present methods is referred to as a greedy scheduler. The greedy scheduler includes inter-cloud scheduling. In inter-cloud scheduling, the cloud-bursting architecture is pipelined and event-based, and pipelining helps to squeeze out greater throughput from the system. This improvement is because every stage of the pipeline is executed in parallel, as opposed to only processing in serial, and is kept loosely bound. The overall architecture is best understood in view of FIG. 4.

The present methods include but is not limited to the following steps. First, user 50 submits print job 52 through web interface 54 to system 56. Then, web server 58 places print job 52 into print job queue 60. Job queue 60 is continuously monitored by system 56. Next, a print job, e.g., job 52, gets selected by controller 62, i.e., the scheduler for system 56. Controller 62 parses the print jobs and invokes pluggable scheduler 64. Based on information derived by bandwidth estimator 66, processor flops estimator 68, network model 70 and QRSM model 72, individual cloud controllers take charge, i.e., internal cloud controller 74 and external cloud controller 76, or in other words, cloud controllers 74 and 76 determine the best balance of processing print jobs at the print-shop and processing print jobs in an external cloud. Dispatcher/collector 78 then dispatches the print job to either internal cloud 80 or external cloud 82. Next, the print job gets processed on the respective cloud to which it was forwarded, and lastly, the print job is returned to dispatcher/collector 78, printed by system 56, for example by printer 84, and then retrieved by the user.

It should be appreciated that the foregoing method differs from typical web workflows and cluster computing is a variety of ways. For example, the foregoing method includes computing clouds separated by the internet, hence the term 'inter-cloud', computing clusters are usually very self-contained and closely knit. The foregoing method includes computing across an inter-cloud to keep the footprint in print-shop extremely small. Although, the reduction of the footprint in the print-shop is limited because reducing the print-shop to zero resources results in sub-optimal through-put, bandwidth utilization, high idleness and low reliability, among other drawbacks. File transfer in the foregoing method is on the order of gigabytes or hundreds of megabytes, i.e., very data and computational intensive, while files transferred in regular hosted systems are typically under a few megabytes.

Figure 5:
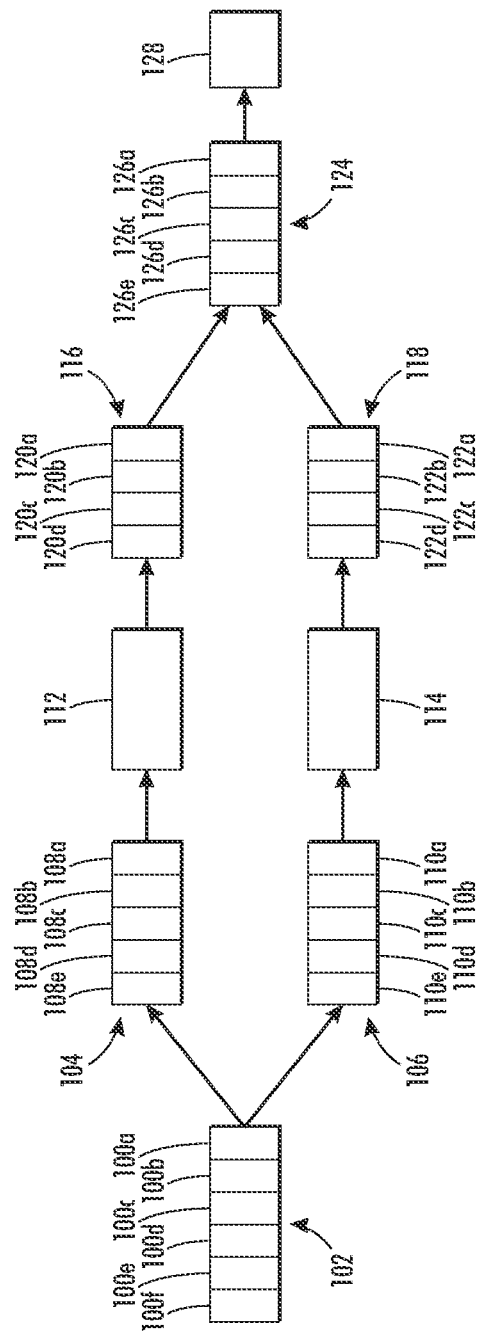
FIG. 5 is a schematic of a print queue and its interaction with internal and external clouds.

Other unique features of the present methods and system are depicted in the pipelined architecture shown in FIG. 5. Print jobs 100*a* through 100*f* are received by print queue 102. Subsequently, based on various system analytics, e.g., bandwidth estimation, the print jobs are distributed to external cloud upload queue 104 and internal cloud upload queue 106 as print jobs 108*a* through 108*e* and print jobs 110*a* through 110*e*, respectively. The respective jobs then pass through external cloud 112 and internal cloud 114. It should be appreciated that external cloud 112 and internal cloud 114 each may include a plurality processors arranged for parallel processing print jobs as they pass through the clouds. Then, the various print jobs from each of the external and internal clouds are passed to external cloud download queue 116 and internal cloud download queue 118, respectively. Each of the download queues 116 and 118 thus include print jobs 120*a* through 120*d* and print jobs 122*a* through 122*d*, respectively. Next, the download queue pass the respective print jobs to print-ready queue 124, wherein print jobs 126*a* through 126*e* are held until forwarded to printer 128. It should be appreciated that every stage occurs in parallel.

The present method may further include an adaptive inter-cloud bursting scheduler, or in other words, an autonomic cloud-burster. The cloud burster uses a host of model-driven control and optimization techniques that maximize through-put and other metrics of performance. For example, the autonomic cloud-burster may provide what is known as opportunistic bursting.

Opportunistic bursting means that not every job is sent to a remote cloud. If conditions do not favor bursting, the engine decides to locally process the job, still with a certain degree of parallelism. This opportunistic decision-making is part of the cloud-bursting engine's capabilities. To achieve this, the scheduler estimates the different parameters of the job using the aforementioned estimation models. In one embodiment, a Quadratic Response Surface Model, described supra, is used to estimate the job execution time, while the time-of-day network model is used to estimate the network overheads for a particular job. The scheduler then reads the current system state from the configuration store and decides whether to burst out the job to an external cloud. Then, the scheduler invokes the dispatcher to transmit the job to the appropriate cloud for computation. The job bursting decision is also influenced by the presence or absence of a particular computational-intensive feature in the internal and/or external clouds.

Computationally intensive tasks, such as RIP, SGM, SBI, etc., in a print job are expressed using the map-reduce paradigm to exploit the hadoop map-reduce cluster available in the internal and the external clouds. It should be appreciated that hadoop refers to a java software framework that supports data-intensive distributed applications. After computation, the print job output is compressed and downloaded, and subsequently added to the print-ready queue.

The following sets forth the pipelined architecture used in the present methods and system. First, the cloud components of the architecture are described. In an experiment conducted in accordance with the present methods and system, the internal cloud was a Hadoop map-reduce cluster formed by the DFEs. The external cloud used Amazon S3 as the job store while an elastic map-reduce cluster used for the computation. The architecture was pipelined (see FIG. 5) and can be thought of as a network of queues. As described supra, the job first enters into the input queue and then migrates to the external cloud or the internal cloud upload queue based on the scheduler decision. Upon upload the print job gets delivered to the execution unit, of the respective cloud, and upon completion the result is downloaded. These queues operate in parallel to improve the system throughput.

The present methods and system may also include what is referred to as a greedy scheduling algorithm. The terms utilized subsequently in the algorithm are set forth below in Table 1. The main concept of the greedy scheduling algorithm is picking the right job from within the queue such that, if cloud-bursted, i.e., sent externally, the job will not delay any of the other jobs in the queue. In other words, if a job is picked from the queue, it will not be required in the internal cloud before the jobs preceding it are internally processed. While the foregoing description may appear to be a simple concept, it is hard to achieve consistently in practice where there are uncertainties in terms of available resources, internet congestion, as well as model errors. Moreover, this is also a real-time algorithm meaning that jobs in the back of the queue cannot be deliberately chosen to avoid the aforementioned problems. In fact, the system is forced to aggressively pick from the beginning portion of the queue. The notation used herein is:

TABLE 1

| Variable | Description |
| --- | --- |
| I | set of jobs that are scheduled in internal cloud (IC) |
| $I_{wait}$ | queue of jobs waiting to execute in IC |
| $I_{exec}$ | queue of jobs executing in IC |
| E | set of jobs that are scheduled in external cloud (EC) |
| $E_{wait}$ | queue of jobs waiting to execute in EC |
| $E_{exec}$ | queue of jobs executing in EC |
| $E_{up}$ | queue of jobs waiting to be uploaded in EC |
| $E_{down}$ | queue of jobs waiting to be downloaded in EC |
| efu(Q) | compute the earliest free upload slot to EC given a job queue Q |
| efd(Q) | compute the earliest free download slot to EC given a job queue Q |
| efe($Q_{exec}$, $Q_{wait}$, $Q_{up}$) | compute the earliest free execution slot on EC given the executing, waiting and uploading job queues |
| efi($Q_{exec}$, $Q_{wait}$) | compute the earliest free execution slot on EC given the executing and the waiting job queues |
| $et_i^I$ | estimated time for execution of $J_i$ on IC |
| $et_i^E$ | estimated time for execution of $J_i$ on EC |
| $b_{up}$ | upload bandwidth to EC |
| $b_{down}$ | download bandwidth from EC |
| $s_i$ | size of $J_i$ |
| $o_i$ | estimated output size of $J_i$ |
| $l_i$ | location at which $J_i$ must be executed (IC or EC) |

With the aforementioned notation, the algorithm greedily decides one of two things for each job, whether or not to burst the job to the external cloud depending on predictions made for jobs flanking the job under consideration. The jobs that were not bursted out but ahead of the job chosen for bursting are expected to complete in the internal cloud at a time not too much after the bursted job arrives back. The aforementioned decision occurs factoring, among others, estimation of level of parallelization, internet bandwidth and achievable processing throughput. The greedy algorithm is outlined as a series of decisions in FIG. 5 based on the variables defined above in Table 1. The greedy algorithm comprises the following steps as set forth in Table 2 herebelow.

TABLE 2

Greedy Scheduling Algorithm

| Step Number | Action taken/Calculation |
|---|---|
| 1: | $eu^E := efu(E_{up})$ |
| 2: | $ed^E := efd(E)$ |
| 3: | $uc_i := eu^E + s_i/b_{up}$ |
| 4: | $ee^E := efe(E_{exec}, E_{wait}, E_{up})$ |
| 5: | $ec_i := \max(uc_i, ee^E) + et_i^E$ |
| 6: | $c_i^E := \max(ec_i, ed^E) + o_i/b_{down}$ |
| 7: | $ee^I := efi(I_{exec}, I_{wait})$ |
| 8: | $c_i^I := ee^I + et_i^I$ |
| 9: | if $c_i^I \leq c_i^E$ then |
| 10: | $l_i := IC$ |
| 11: | else |
| 12: | $l_i := EC$ |
| 13: | end if |
| 14: | return $l_i$ |

Figure 6:
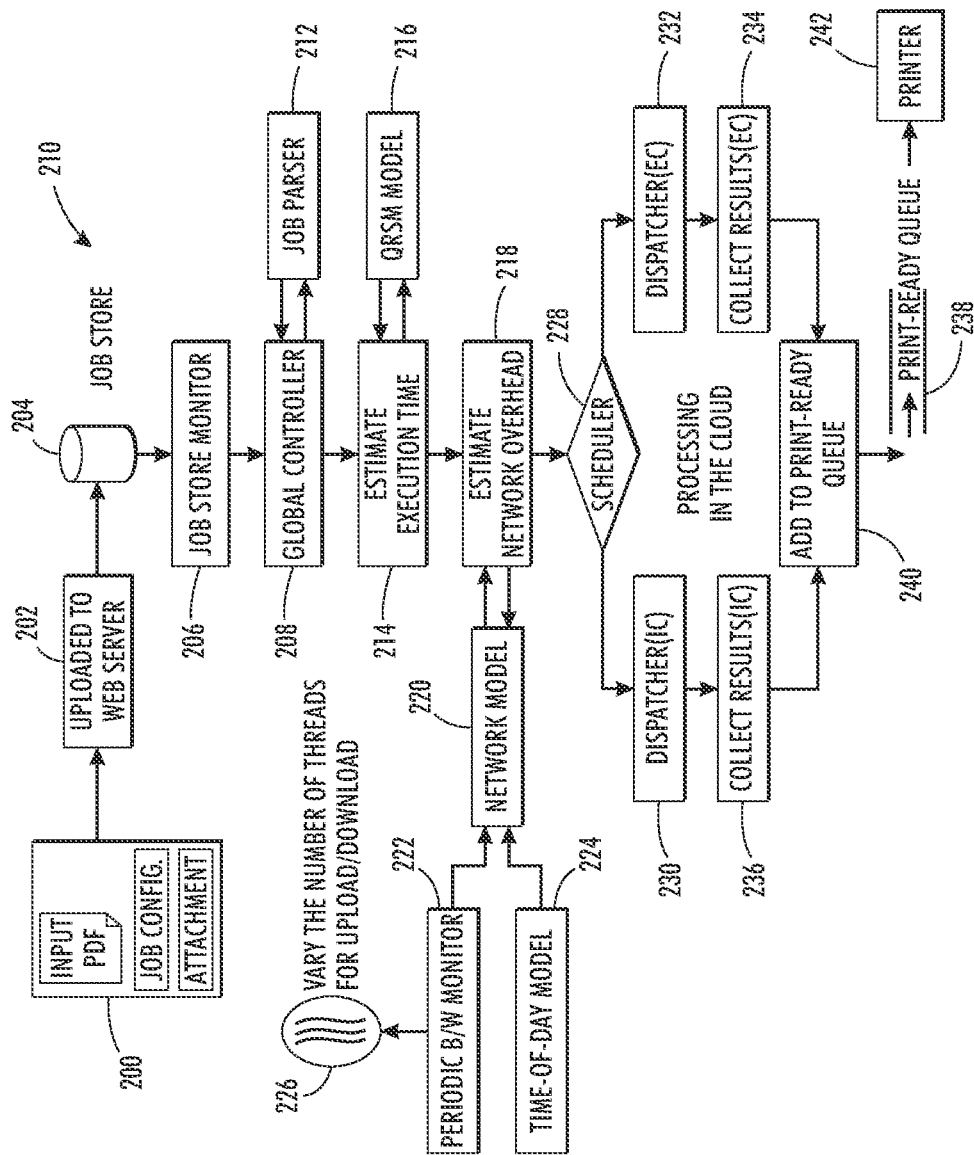
FIG. 6 is a schematic of another embodiment of the present system used to control printing of print job in a print-shop.

The foregoing algorithm is based on the models described supra. The overall flowchart with respect to the above described decision making process is shown FIG. 6. Print job 200 is uploaded to web server 202 by a user. Then, web server 202 places print job 200 into print job store 204. Job store 204 is continuously monitored by job store monitor 206. Next, a print job, e.g., job 200, gets selected by global controller 208, i.e., the scheduler for system 210. Controller 208 determines how to parse the print jobs via interaction with job parser 212. Global controller 208 passes print job 200 to estimate execution time module 214 which module interfaces with QRSM model 216 in order to estimate an execution time for processing print job 200. Next, print job 200 is passed to estimate network overhead module 218 which module interfaces with network model 220 in order to estimate network overhead. Network model 220 receives input from periodic bandwidth monitor 222 and time-of-day-model 224, from model 220 predicts network overhead as described above. It should be appreciated that bandwidth monitor 222 varies the number of threads used for uploading and downloading via thread variation module 226 in order to optimize network bandwidth. Then, based on the results obtained by time module 214 and network overhead module 218, scheduler 228 either routes print job 200 to internal cloud dispatcher 230 or external cloud dispatcher 232. Dispatchers 230 and 232 forward print job 200 in accordance with the description of FIG. 5 above. After print job 200 is processed in the external or internal cloud, the result is collected external results collector 234 or internal results collector 236 depending upon where the print job was sent by scheduler 228. Subsequently, print job 200 is added to print-ready queue 238 (via step 240), passed to printer 242, and then retrieved by the user.

Experimental Testing of Present Invention Methods and System

The foregoing methods and system have been tested as described infra. The experiments were carried out using a test-bed that involved an internal cloud comprising a maximum of 8 nodes and an external cloud comprising 3 nodes on Amazon S3. These were referred to as the computational resources and can be chosen in any combination. For calibrating the bandwidth estimator, periodic uploads and downloads of data files of 1 megabyte in size were sent to and from Amazon S3. The process varies the number of download/upload threads and converges upon the optimum number of threads to be used for that time-period. Thus, the different portions of the job(s) and result(s) are downloaded in parallel, using multiple threads to maximize the bandwidth utilization to and from Amazon S3.

Figure 7A:
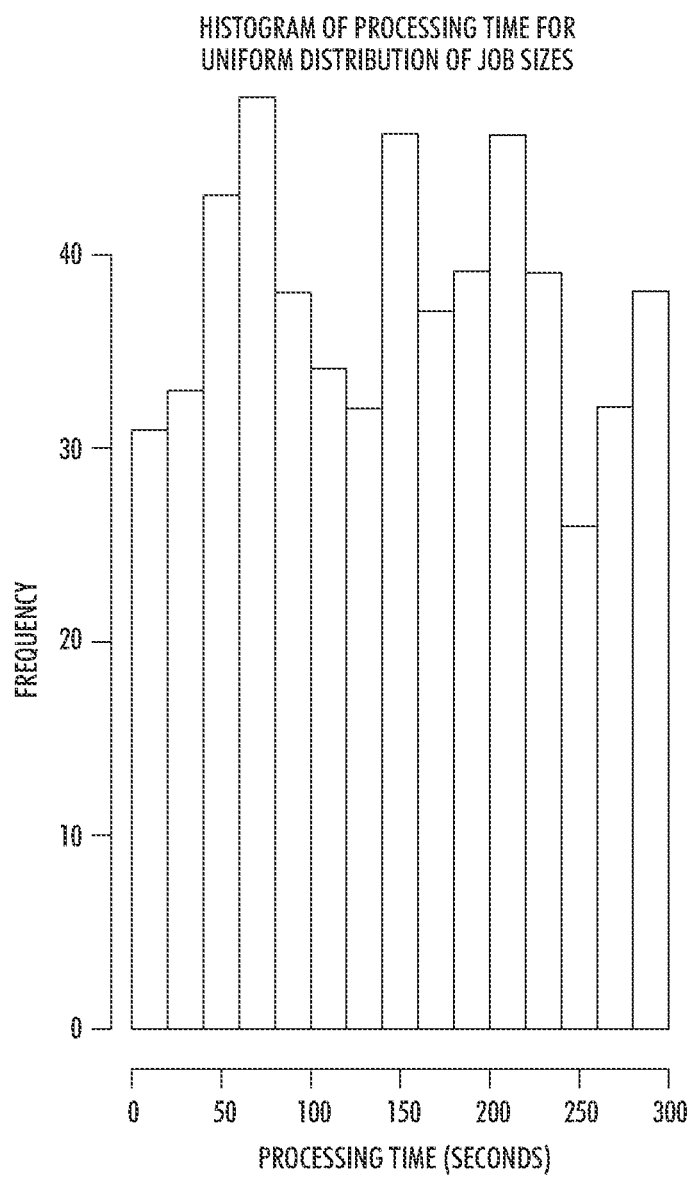
FIG. 7a is a graph showing a histogram of processing times for a uniform distribution of print job sizes.
Figure 7B:
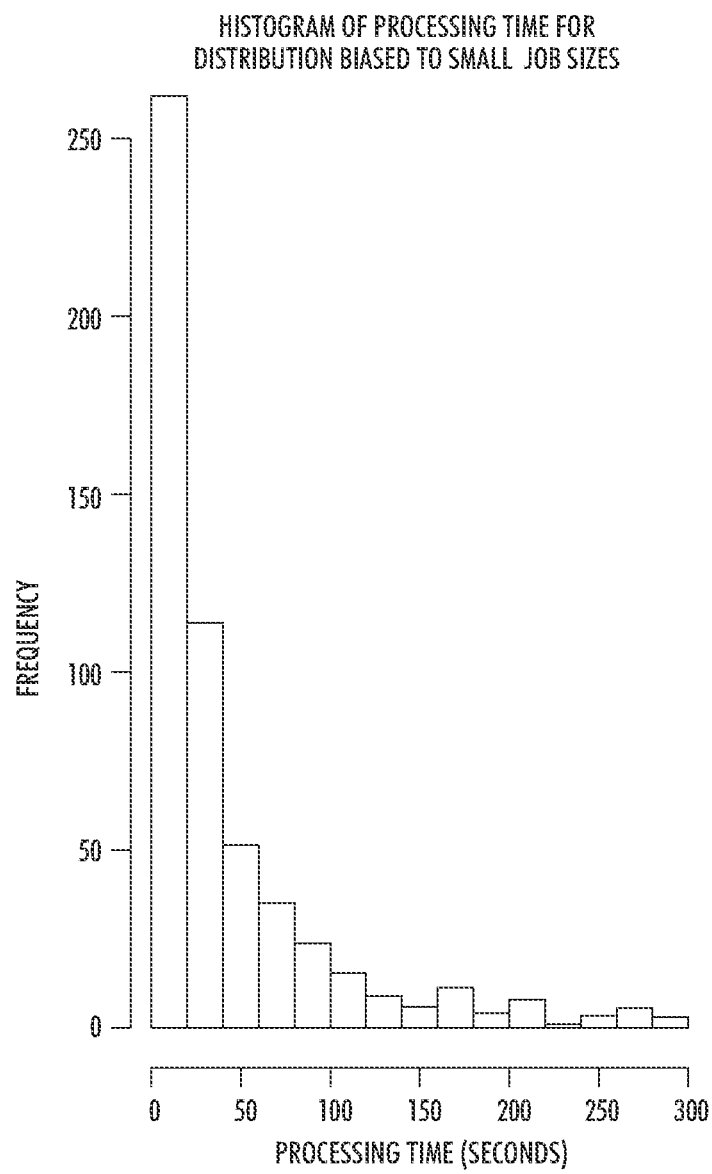
FIG. 7b is a graph showing a histogram of processing times for a distribution of print job sizes biased to small job sizes.
Figure 7C:
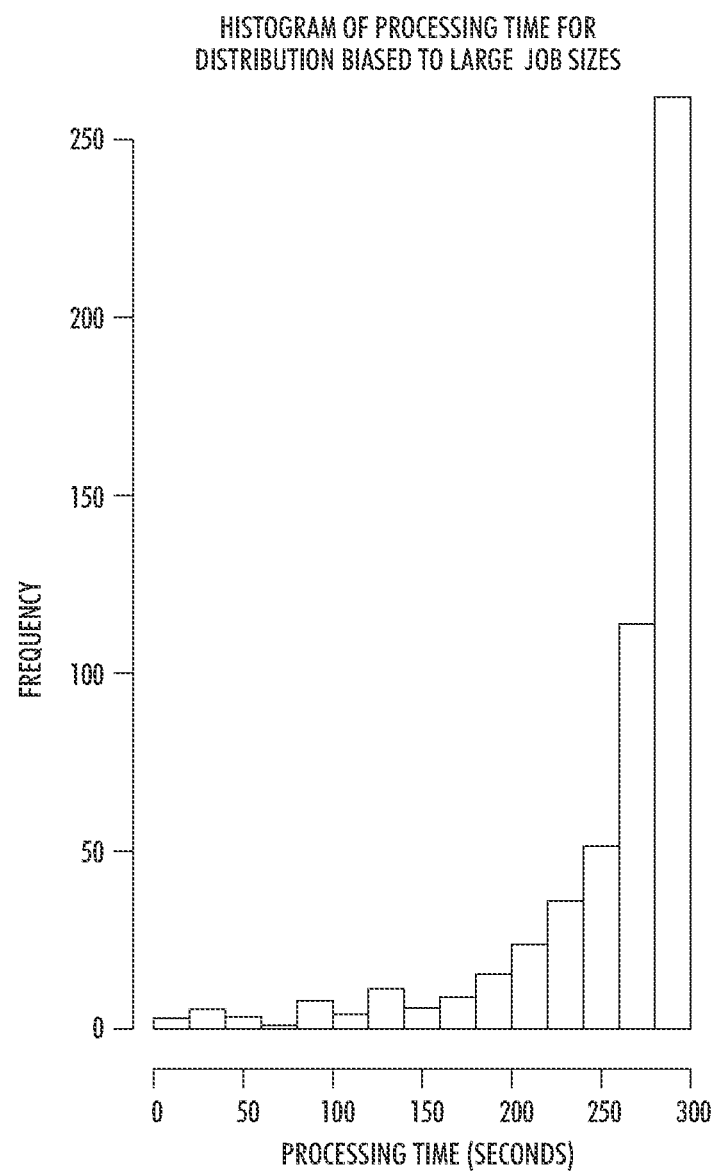
FIG. 7c is a graph showing a histogram of processing times for a distribution of print job sizes biased to large job sizes.

Three buckets from the production jobs were created and considered. These jobs were production quality pictures, along with text in some cases, which varied in size from 1 megabyte to 300 megabytes. The distribution of job sizes in each of these buckets is shown in the histograms of FIGS. 7a-7c, not in terms of megabytes but in terms of seconds taken to process each given job type, such as RIP, under consideration. The first bucket had a uniform distribution of job sizes (FIG. 7a); the second one was biased towards small jobs (FIG. 7b); and, the last one was biased towards large jobs (FIG. 7c). The following experiments were conducted for the above job buckets. In other words, an experiment would consist of running the cloud-bursting scheduler for a replication that consisting of jobs from one of the buckets at a time. Performance metrics such as speedup, system utilization, average delay, etc. were evaluated. The foregoing experiments were repeated for different numbers of nodes in the internal cloud and the external cloud. In each experiment, a batch of jobs from a particular bucket arrived every 5 minutes according to a Poisson process with mean arrival rate $\lambda=15$ per batch.

Performance metrics were calculated in accordance with the Equations (4)-(7) shown herebelow.

$$J = \{j_1, j_2, j_3 \ldots j_n\} \ldots \text{set of jobs} \quad (4)$$

$$e_i = \text{execution time of } j_i \text{ on the standard machine} \quad (5)$$

$$st_i = \text{arrival time of } j_i \quad (6)$$

$$et_i = \text{completion time of } j_i \quad (7)$$

Figure 8:
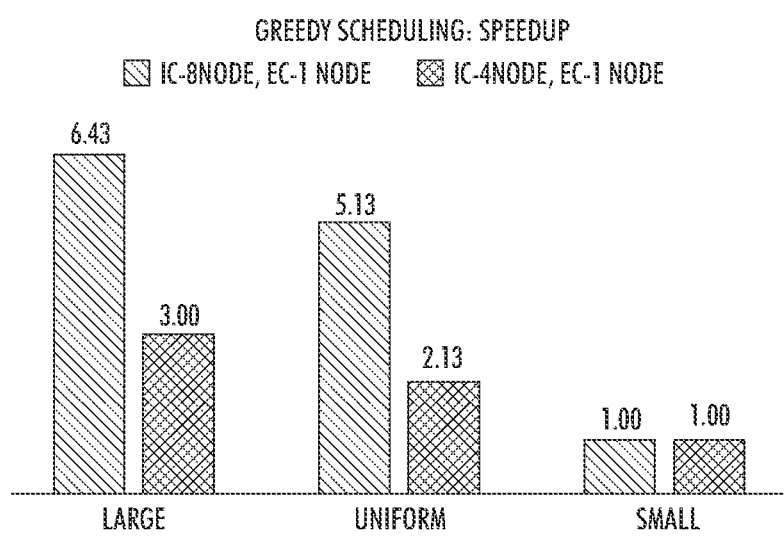
FIG. 8 is a graph showing speedup obtained using greedy scheduling under two configurations of internal and external clouds.

Given a set of jobs, speedup is defined as the ratio of the total time taken to run a set of jobs sequentially on a standard machine, i.e., Intel® Core 2 Duo, 2 Gigabytes of RAM, to the time taken to run the same set of jobs using the cloud bursting approach, internal and external clouds combined. In the print-shop, the standard machine is a single Digital Front End (DFE) for an iGen class device. The three types of workloads considered are the jobs that arrive at this DFE. The speedup for greedy scheduling is shown in FIG. 8. Speedup (s) is defined in Equation (8) herebelow.

$$s = \frac{T_{seq}}{T_{cloud}} \quad (8)$$

where:

$$T_{seq} = \sum_{i=1}^{n} e_i \ldots$$

time taken to run the set of jobs sequentially on a standard machine; and, $T_{cloud}$=max([$et_i$])−min([$st_i$]) ... time taken to run the set of jobs on the cloud with cloud bursting.

Figure 9:
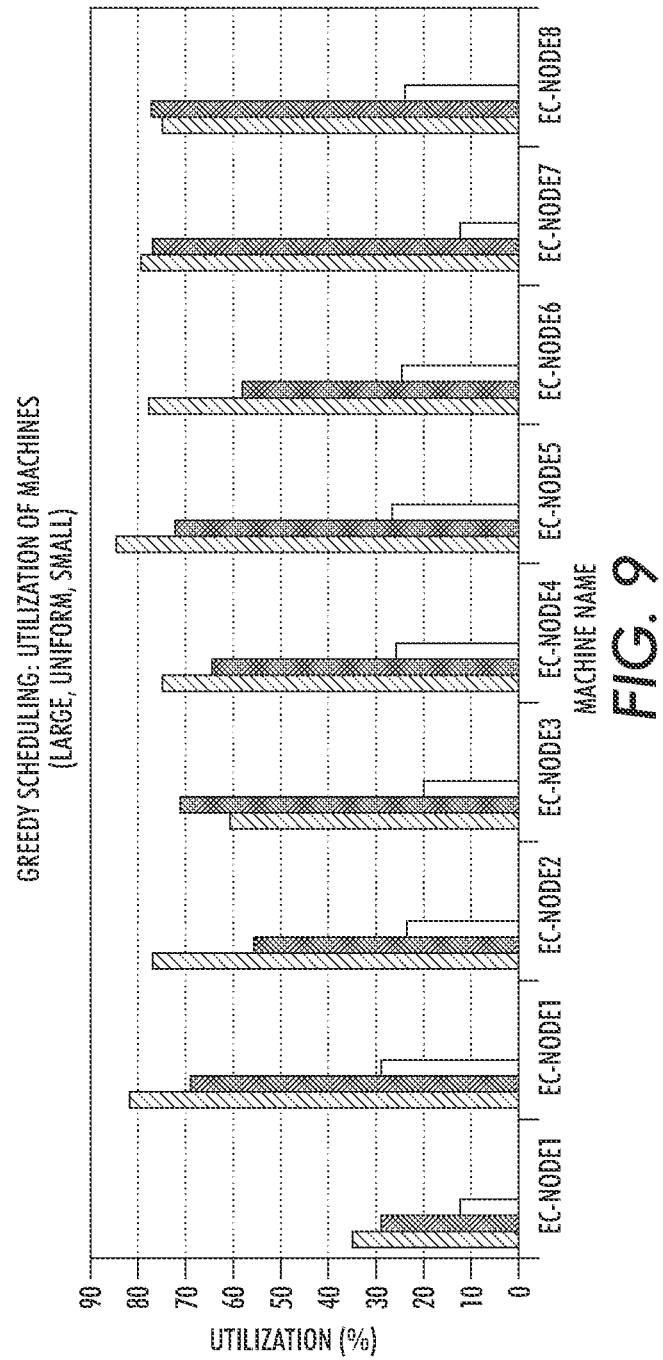
FIG. 9 is a graph showing utilization of machines obtained using greedy scheduling when processing a uniform distribution of print job sizes, a distribution of print job sizes biased to small job sizes and a distribution of print job sizes biased to large job sizes.

The system utilization ($U_m$) of a particular machine (m) during the execution of the job set (J) is defined as the percentage of time the machine (m) is utilized for executing the jobs from the job set during the total run time of the job set. The utilization of the individual machines in the internal cloud and external cloud is shown in FIG. 9. System utilization was calculated according to Equation (9) herebelow.

$$U_m = \frac{B_m}{T_{cloud}} \qquad (9)$$

where: $B_m$=time for which machine m is utilized during execution of job set.

System utilization for the internal cloud ($U^{IC}$) is defined as the average utilization of the machines involved in the computation in the internal cloud and shown in Equation (10) herebelow.

$$U^{IC} = \frac{1}{|IC|} \sum_{m \in IC} U_m \qquad (10)$$

where: |IC|=number of machines in internal cloud.

System utilization for the external cloud ($U^{EC}$) is defined as the average utilization of the machines involved in the computation in the external cloud and shown in Equation (11) herebelow.

$$U^{EC} = \frac{1}{|EC|} \sum_{m \in EC} U_m \qquad (11)$$

where: |EC|=number of machines in external cloud.

Figure 10:
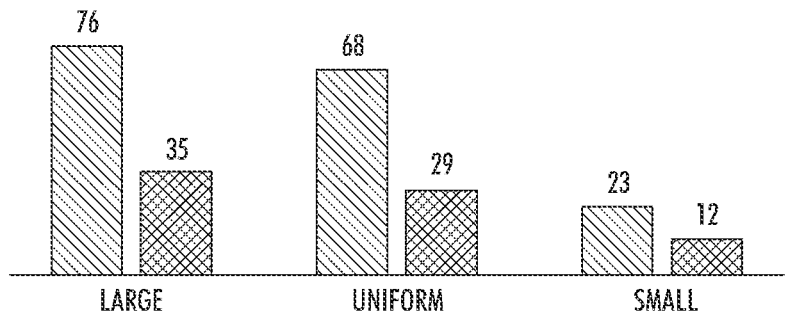
FIG. 10 is a graph showing average utilization of internal and external clouds using greedy scheduling when processing a uniform distribution of print job sizes, a distribution of print job sizes biased to small job sizes and a distribution of print job sizes biased to large job sizes.

Overall system utilization (U) is defined as the average utilization of the system during the computation. The average utilization of the internal cloud (IC) and the external cloud (EC) for greedy scheduling (IC=8 nodes and EC=1 node) is shown in FIG. 10. Overall system utilization is calculated according to Equation (12) herebelow.

$$U = \frac{|EC|*U^{EC} + |IC|*U^{IC}}{|EC| + |IC|} \qquad (12)$$

Figure 11:
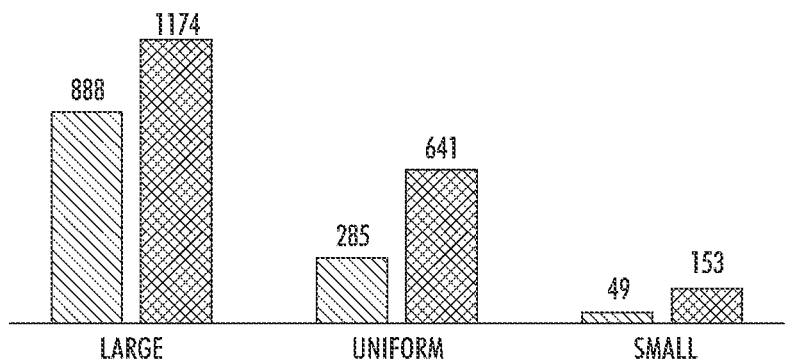
FIG. 11 is a graph showing average delay per job when utilization internal and external clouds using greedy scheduling for processing a uniform distribution of print job sizes, a distribution of print job sizes biased to small job sizes and a distribution of print job sizes biased to large job sizes.

Average Delay (w) is defined as the average waiting time of jobs in the system. The average delay per job is shown in FIG. 11. The average delay is calculated according to Equation (13) herebelow.

$$w = \frac{1}{|J|} \sum w_i \qquad (13)$$

where: $w_i$=waiting time of the job $j_i$; and, |J|=number of jobs.

Figure 12:
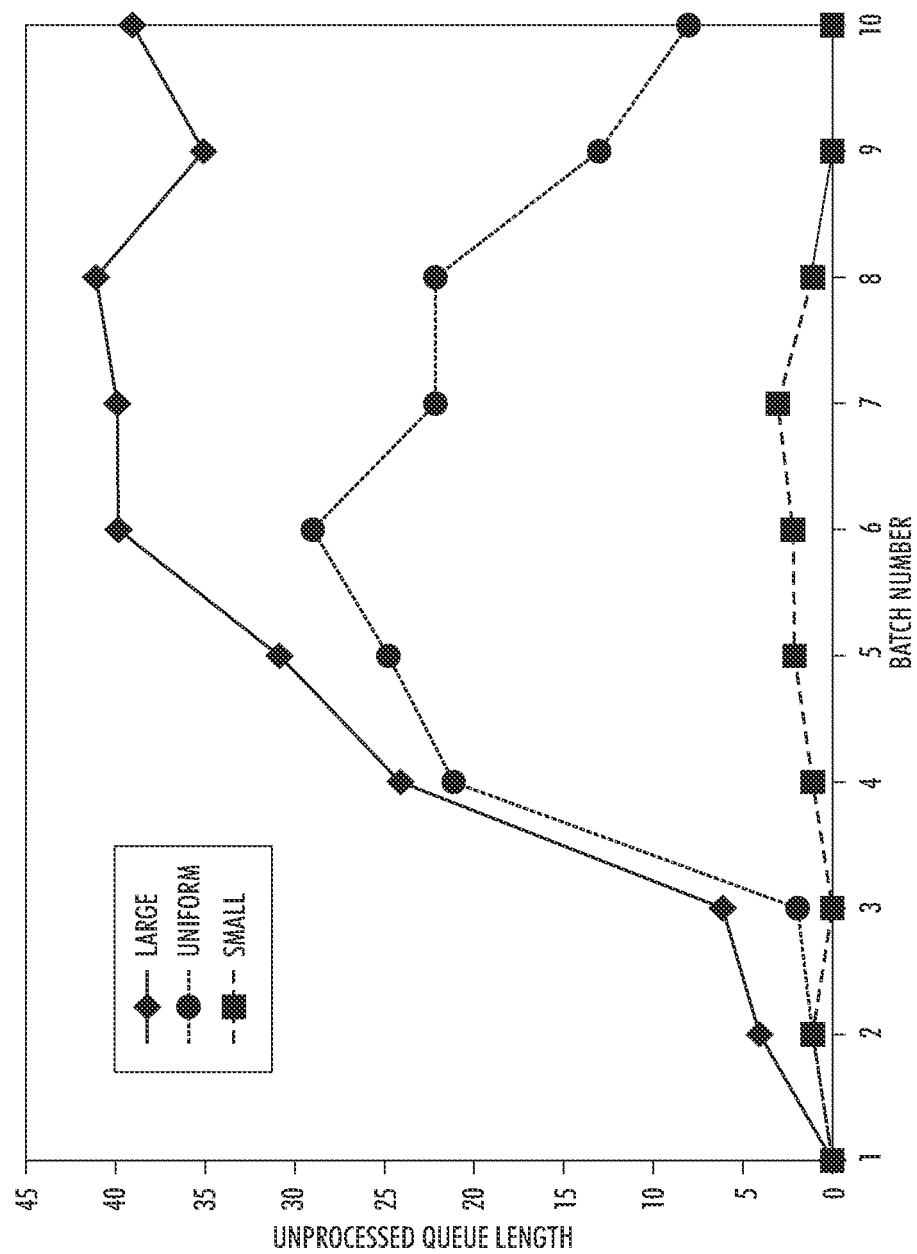
FIG. 12 is a graph showing the number of unprocessed print jobs in a print queue when using greedy scheduling for processing a uniform distribution of print job sizes, a distribution of print job sizes biased to small job sizes and a distribution of print job sizes biased to large job sizes; and, FIG. 13 is a schematic showing a digital front end of a data center connected to internal and external clouds.

FIG. 12 shows the number of jobs that were unprocessed when a new batch arrived. In case of the large jobs, the unprocessed queue reaches equilibrium if conditions such as job arrival rate, size and bandwidth remain somewhat stationary. Any deviation warrants adaptive action.

It was observed that speedup is proportional to the utilization of the system. Hence, higher speedup is obtained in the case of large jobs as opposed to the other two cases. Low utilization is caused due to network delay. When the jobs are short-running ones, the rate at which jobs can be delivered for processing largely determines the utilization. In case of large jobs the computation time on average is higher than the network delivery time and hence the execution unit is more utilized. Whereas, in the other two cases, the average computation time drops down and the network delay assumes more significance. The utilization of the external cloud (EC) is minimal, because jobs get pushed to the EC only if their estimated completion time in the EC is less than that in the internal cloud. Moreover, the bandwidth varies sporadically, and hence the time in the EC is over estimated to ensure completion in time. To arrive at better estimates, it has been found that the use of time-of-day network models is beneficial. Furthermore, speculatively scheduling jobs can also improve the utilization of the external cloud. The results for small and medium job buckets are intuitive, i.e., remaining jobs per batch are close to zero in the small case and they oscillate for the medium case. For the large bucket, it is expected that it will reach equilibrium at some level.

It should be appreciated that the present methods of processing print jobs by bursting out to an external computing cloud operates without delaying or re-ordering other jobs. The methods apply generically to computing on a hybrid cloud but focus on autonomically dividing workload between a public cloud, i.e., external cloud, and a private cloud, i.e., internal cloud, for bandwidth intensive print-shop processing. The use of self-tuning models considers bandwidth and processing time, and the use of these models enables reduction in the randomness associated with processing on heterogeneous resources in an inter-cloud fashion and sporadic variations in internet bandwidth for gargantuan file sizes that are atypical for the regular software-as-a-service (SAAS) workload model. Cloud computing provides significant flexibility advantage for print processing, and the present methods are useful for scheduling and controlling such a system.

Although the aforementioned aspects are primarily directed at methods and systems for handling print jobs, it has been found that the present invention may also be used in data centers, for example, with respect to document analysis. Such analysis may include receiving a document or plurality of documents and determining aspects of those documents such as word count, word analysis, document category analysis, etc. Thus, various aspects may be embedded with a document, as a meta-tag for example, so that documents may be sort, categorized, searched, etc., at a later time.

In view of the foregoing it should be appreciated that the present method also includes a method for controlling flow of a plurality of documents in a data center. As used herein, "data center" is intended to mean a real or virtual location wherein documents are received, stored and accessible as needed. The first step of this method comprises receiving the plurality of documents in a first processing queue. The first processing queue is a storage location such as a memory unit where the documents first arrive. Next, a first arithmetic logic unit performs at least one of the following calculations: determining an estimated execution time for processing a first document of the plurality of documents; and, determining an estimated network overhead for transmitting the first document to an external cloud and receiving the first document from the external cloud. It should be appreciated that the estimated execution time may be calculated for analyzing the document on an internal and/or external cloud. Then, the first document to either forwarded to the internal cloud or the external cloud based on the estimated execution time, the estimated network overhead or combinations thereof. Such forwarding is performed by, for example, a communication unit. The communication units may include wireless transmission, wired transmission or a combination thereof. Moreover, the communication unit may utilize TCP/IP, cellular, etc.

Next, based on the step of forwarding, the first document is processed in either the external cloud or the internal cloud. The processing of the first document is performed by at least one second arithmetic logic unit in the external cloud or is performed by at least one third arithmetic logic unit in the internal cloud and results in a first processed document. It should be appreciated that both the internal and external clouds are scalable as required by the volume of document analysis. Thus, depending on such needs, either cloud may include one or more processing units, e.g., computers, and the number of available processing units may vary in real time. Subsequent to document processing, the first processed document is received in a post-processing queue. Similar to the pre-processing queue, the post-processing queue is contained within the memory unit. Lastly, the first processed document is passed from the post-processing queue to a subsequent stage.

The processing of documents results in a variety of types of information regarding each respective document that may be subsequently used to categorize or search a collection of processed documents. Such information may include a word count, a word analysis, a document category analysis, metadata and combinations thereof. Additionally, the subsequent stage which the processed document is passed to may be a printing device, a storage device, the pre-processing queue and combinations thereof. Thus, processed documents may be, for example, printed, stored, searched, categorized, etc.

Moreover, in view of the foregoing it should be further appreciated that the present method also includes a method of identifying a first document in a pre-processing queue selected from a plurality of documents in the pre-processing queue which may be bursted to an external cloud for processing of the first document while substantially preserving a processing order of the plurality of documents. It should be appreciated that the processing order comprises a sequential ordering of the plurality of documents based on an order in which each of the plurality of documents is received from a user in the pre-processing queue. It is desirable to maintain this order as the parties providing the documents for analysis have an expectation that processing will occur in the order in which the documents are received. For the purposes of this method, i.e., determination of the first burstable document, the position of the first document is initially second from the top position in the pre-processing queue. The method comprises first calculating a first estimated time for completion of processing the first document, wherein the first estimated time for completion comprises an execution time and a network overhead time. Such calculating occurs in an arithmetic logic unit, the execution time and network overhead time are the same as described above with respect to processing of print jobs. Next, a second estimated time for completion of processing documents that arrived in the pre-processing queue prior to the first document is calculated in the arithmetic logic unit. Then, the first and second estimated times are compared using the arithmetic logic unit. When the first estimated time for completion is less than the second estimated time for completion, the first document is identified as burstable. Alternatively, when the first estimated time for completion is greater than the second estimated time for completion the position of the first document is increased by one from the top position in the pre-processing queue and foregoing steps are repeated. As described above, the first document identified as burstable is forwarded to an external cloud for processing, while the documents in the pre-processing queue received prior to that burstable document are processed in the internal cloud.

Figure 13:
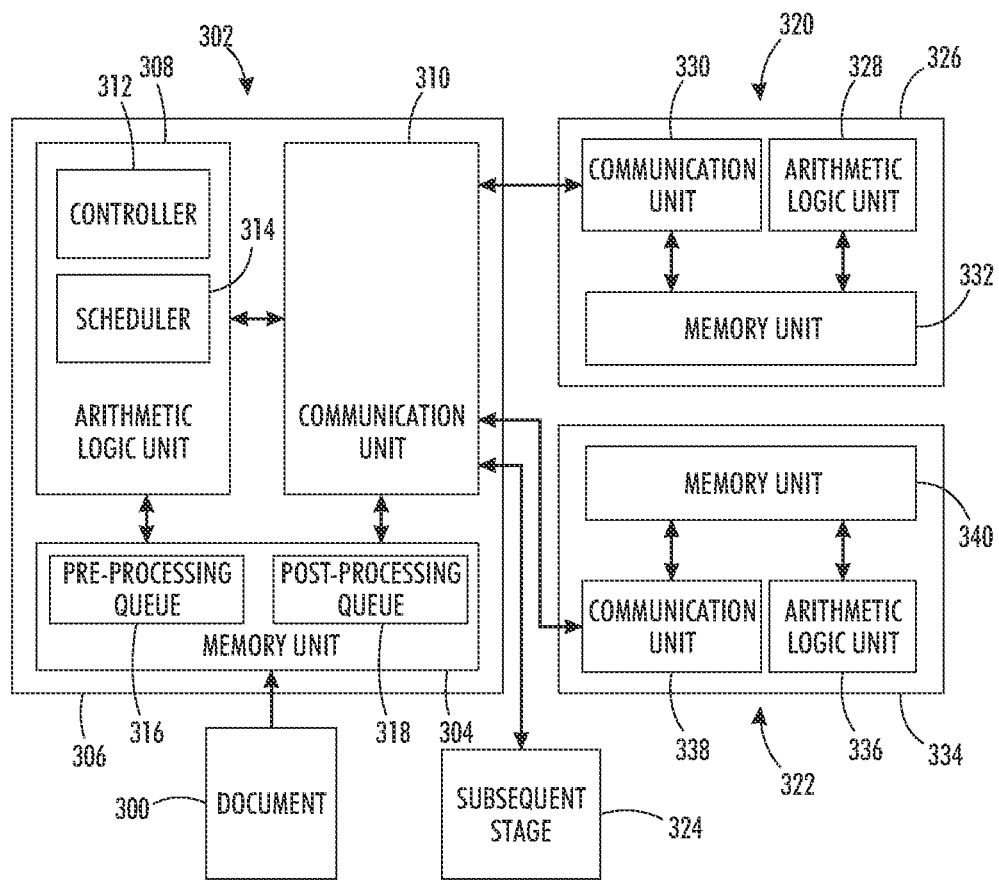

In view of the foregoing, FIG. 13 shows an example of a system which includes a digital front end for a data center, an internal cloud, an external cloud and a subsequent stage. In this example, document 300 is received by digital front end 302 in memory unit 304 arranged in computer 306. Computer 306 further includes arithmetic logic unit 308 and communication unit 310. Arithmetic logic unit 308 includes controller 312 and scheduler 314 and is arranged to interface with both memory unit 304 and communication unit 310, as is well known in the art. Memory unit 304 further includes pre-processing queue 316 and post-processing queue 318. Communication unit 310 is arranged to interface with internal cloud 320, external cloud 322 and subsequent stage 324, e.g., a printer, a storage device or subsequent processing queue. Internal cloud 320 comprises computer 326, and computer 326 in turn comprises arithmetic logic unit 328, communication unit 330 and memory unit 332. Similarly, external cloud 322 comprises computer 334, and computer 334 in turn comprises arithmetic logic unit 336, communication unit 338 and memory unit 340. It should be appreciated that the foregoing arrangements of computers 306, 326 and 334 are merely examples, and the structures of computers 306, 326 and 334 may take other forms known in the art. Moreover, although digital front end 302, internal cloud 320 and external cloud 322 are depicted as each comprising a single computer, it should be appreciated that digital front end 302, internal cloud 320 and/or external cloud 322 may comprise more than one computer interconnected with the other computers of that particular cloud. Additionally, digital front end 302, internal cloud 320 and/or external cloud 322 may comprise a plurality of computers which are accessible based upon the processing requirement for the digital front end or the respective cloud.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for controlling flow of a print job from a user to a printer in a print-shop, the method comprising:
    a) receiving a raw print job from a user in a print job store, wherein a memory unit comprises the print job store;
    b) performing in a first arithmetic logic unit at least one of: determining an estimated execution time for processing the raw print job; and, determining an estimated network overhead for transmitting the raw print job to an external cloud and receiving the raw print job from the external cloud;
    c) forwarding the raw print job to either an internal cloud or the external cloud based on the estimated execution time, the estimated network overhead or combinations thereof, wherein the step of forwarding is performed by a communication unit;
    d) processing the raw print job in the external cloud or the internal cloud based on the step of forwarding, wherein the processing of the raw print job results in a processed print job and at least one second arithmetic logic unit performs the step of processing of the raw print job in the external cloud and at least one third arithmetic logic unit performs the step of processing of the raw print job in the internal cloud;
e) receiving the processed print job in a print-ready queue, wherein the memory unit comprises the print-ready queue; and,
f) passing the processed print job from the print ready queue to the printer.

2. The method of claim 1 wherein the estimated execution time is determined using a quadratic response surface model.

3. The method of claim 1 wherein the estimated network overhead is determined using a network model selected from the group consisting of: a periodic bandwidth monitor; a time-of-day bandwidth model; and, combinations thereof.

4. The method of claim 1 wherein the external cloud comprises at least one computer and the at least one computer comprises the at least one second arithmetic logic unit.

5. The method of claim 1 wherein the internal cloud comprises at least one computer and the at least one computer comprises the at least one third arithmetic logic unit.

6. The method of claim 1 wherein the print job store comprises a plurality of raw print jobs arranged sequentially in a queue based on a time of receipt of each of the plurality of raw print jobs.

7. The method of claim 6 wherein the plurality of raw print jobs remains sequentially arranged after processing and receipt in the print-ready queue.

8. A method for controlling flow of a plurality of raw print jobs from at least one user to at least one printer in a print-shop, the method comprising:
   a) receiving the plurality of raw print jobs from the at least one user in a print job store, wherein a memory unit comprises the print job store;
   b) arranging the plurality of raw print jobs in the print job store sequentially in a queue based on a time of receipt of each of the plurality of raw print jobs, wherein a top of the queue comprises raw print jobs from the plurality of raw print jobs received first in time and a bottom of the queue comprises raw print jobs from the plurality of raw print jobs received last in time, wherein the step of arranging is performed by a first arithmetic logic unit;
   c) forwarding the top of the queue to an internal cloud and forwarding the bottom of the queue to an external cloud, wherein the step of forwarding is performed by a communication unit;
   d) processing in at least one second arithmetic logic unit the top of the queue in the internal cloud and processing in at least one third arithmetic logic unit the bottom of the queue in the external cloud, wherein the processing of the raw print jobs in the top of the queue and the bottom of the queue results in processed print jobs in the top of the queue and the bottom of the queue, respectively;
   e) receiving the top of the queue and the bottom of the queue a print-ready queue, wherein said top and bottom queues are each respectively received by the print-ready queue immediately after the step of processing is complete, the print-ready queue comprises a plurality of processed print jobs and the memory unit comprises the print-ready queue; and,
   f) passing the plurality of processed print jobs from the print ready queue to the printer.

9. The method of claim 8 wherein the internal cloud comprises at least one computer and the at least one computer comprises the at least one second arithmetic logic unit.

10. The method of claim 8 wherein the external cloud comprises at least one computer and the at least one computer comprises the at least one third arithmetic logic unit.

11. A method of identifying a first print job in a print queue selected from a plurality of print jobs in the print queue which may be bursted to an external cloud for processing of the first print job while substantially preserving a processing order of the plurality of print jobs, wherein the processing order comprises a sequential ordering of the plurality of print jobs based on an order in which each of the plurality of print jobs is received from a user in the print queue and a position of the first print job is initially second from a top position in the print queue, the method comprising:
   a) calculating in an arithmetic logic unit a first estimated time for completion of processing the first print job, wherein the first estimated time for completion comprises an execution time and a network overhead time;
   b) calculating in the arithmetic logic unit a second estimated time for completion of processing print jobs that arrived in the print queue prior to the first print job; and,
   c) comparing with the arithmetic logic unit the first estimated time for completion and the second estimated time for completion, wherein when the first estimated time for completion is less than the second estimated time for completion the first print job is identified as burstable, and when the first estimated time for completion is greater than the second estimated time for completion the position of the first print job is increased by one from the top position in the print queue and steps a) through c) are repeated.

12. The method of claim 11 wherein the first estimated time for completion is determined using a quadratic response surface model, the second estimated time for completion is determined using a quadratic response surface model, or the first and second estimated times for completion are determined using a quadratic response surface model.

13. The method of claim 11 wherein the first estimated time for completion is determined using a network model selected from the group consisting of: a periodic bandwidth monitor; a time-of-day bandwidth model; and, combinations thereof, the second estimated time for completion is determined using a network model selected from the group consisting of: a periodic bandwidth monitor; a time-of-day bandwidth model; and, combinations thereof, or the first and second estimated times for completion are determined using a network model selected from the group consisting of: a periodic bandwidth monitor; a time-of-day bandwidth model; and, combinations thereof.

14. The method of claim 11 wherein the first estimated time for completion is determined using a quadratic response surface model and using a network model selected from the group consisting of: a periodic bandwidth monitor; a time-of-day bandwidth model; and, combinations thereof, the second estimated time for completion is determined using a quadratic response surface model and using a network model selected from the group consisting of: a periodic bandwidth monitor; a time-of-day bandwidth model; and, combinations thereof, or the first and second estimated times for completion are determined using a quadratic response surface model and using a network model selected from the group consisting of: a periodic bandwidth monitor; a time-of-day bandwidth model; and, combinations thereof.

15. The method of claim 11 wherein the first print job identified as burstable is forwarded to an external cloud for processing.

16. A system for controlling flow of a plurality of raw print jobs from at least one user to at least one printer in a print-shop, the system comprising:
   a memory unit comprising a print job queue adapted to received the plurality of raw print jobs;

an arithmetic logic unit comprising a controller adapted to monitor the plurality of raw print jobs;

an estimation module comprising at least one of an estimated execution time module and an estimated network overhead module, wherein the estimation module is executed in the arithmetic logic unit and is adapted to estimate a time to process each of the plurality of raw print jobs and the estimated network overhead module is adapted to estimate a time to transmit each of the plurality of raw print jobs to an external cloud and receive each of the plurality of raw print jobs from the external cloud;

the arithmetic logic unit further comprising a scheduler adapted to transmit each of the plurality of raw print jobs to the external cloud or the internal cloud based upon at least one of the time to process each of the plurality of raw print jobs and the time to transmit each of the plurality of raw print jobs to the external cloud and to receive each of the plurality of raw print jobs from the external cloud, wherein the external and internal clouds are each adapted to process the plurality of raw print jobs to a plurality of processed print jobs and the external and internal clouds each comprise at least one arithmetic logic unit adapted to process the plurality of raw print jobs; and, the memory unit further comprises a print ready queue adapted to receive the plurality of processed print jobs and to send the plurality of processed print jobs to a printer.

17. The system of claim 16 wherein the estimated execution time module comprises a quadratic response surface model.

18. The system of claim 16 wherein the estimated network overhead module comprises a network model selected from the group consisting of: a periodic bandwidth monitor; a time-of-day bandwidth model; and, combinations thereof.

19. The system of claim 16 wherein the internal cloud comprises at least one computer and the at least one computer comprises the at least one arithmetic logic unit.

20. The system of claim 16 wherein the external cloud comprises at least one computer and the at least one computer comprises the at least one arithmetic logic unit.

21. A method for controlling flow of a plurality of documents in a data center, the method comprising:
  a) receiving the plurality of documents in a first processing queue, wherein a memory unit comprises the pre-processing queue;
  b) performing in a first arithmetic logic unit at least one of: determining an estimated execution time for processing a first document of the plurality of documents; and, determining an estimated network overhead for transmitting the first document to an external cloud and receiving the first document from the external cloud;
  c) forwarding the first document to either an internal cloud or the external cloud based on the estimated execution time, the estimated network overhead or combinations thereof, wherein the step of forwarding is performed by a communication unit;
  d) processing the first document in the external cloud or the internal cloud based on the step of forwarding, wherein the processing of the first document results in a first processed document and at least one second arithmetic logic unit performs the step of processing of the first document in the external cloud and at least one third arithmetic logic unit performs the step of processing of the first document in the internal cloud;
  e) receiving the first processed document in a post-processing queue, wherein the memory unit comprises the post-processing queue; and,
  f) passing the first processed document from the post-processing queue to a subsequent stage.

22. The method of claim 21 wherein the first processed document comprises a set of information derived from the step of processing the first document, and the set of information is selected from the group consisting of: a word count, a word analysis, a document category analysis, metadata and combinations thereof.

23. The method of claim 21 wherein the subsequent stage is selected from the group consisting of: a printing device, a storage device, the pre-processing queue and combinations thereof.

24. A method of identifying a first document in a pre-processing queue selected from a plurality of documents in the pre-processing queue which may be bursted to an external cloud for processing of the first document while substantially preserving a processing order of the plurality of documents, wherein the processing order comprises a sequential ordering of the plurality of documents based on an order in which each of the plurality of documents is received from a user in the pre-processing queue and a position of the first document is initially second from a top position in the pre-processing queue, the method comprising:
  a) calculating in an arithmetic logic unit a first estimated time for completion of processing the first document, wherein the first estimated time for completion comprises an execution time and a network overhead time;
  b) calculating in the arithmetic logic unit a second estimated time for completion of processing documents that arrived in the pre-processing queue prior to the first document; and,
  c) comparing with the arithmetic logic unit the first estimated time for completion and the second estimated time for completion, wherein when the first estimated time for completion is less than the second estimated time for completion the first document is identified as burstable, and when the first estimated time for completion is greater than the second estimated time for completion the position of the first document is increased by one from the top position in the pre-processing queue and steps a) through c) are repeated.

25. The method of claim 24 wherein the first document identified as burstable is forwarded to an external cloud for processing.

* * * * *